Jan. 21, 1969

C. C. PATTON 3,423,615

EDDY CURRENT COUPLING DEVICE

Filed Sept. 1, 1964

INVENTOR.
Charles C. Patton,
BY Brown, Jackson,
Boettcher & Dienner Attys.

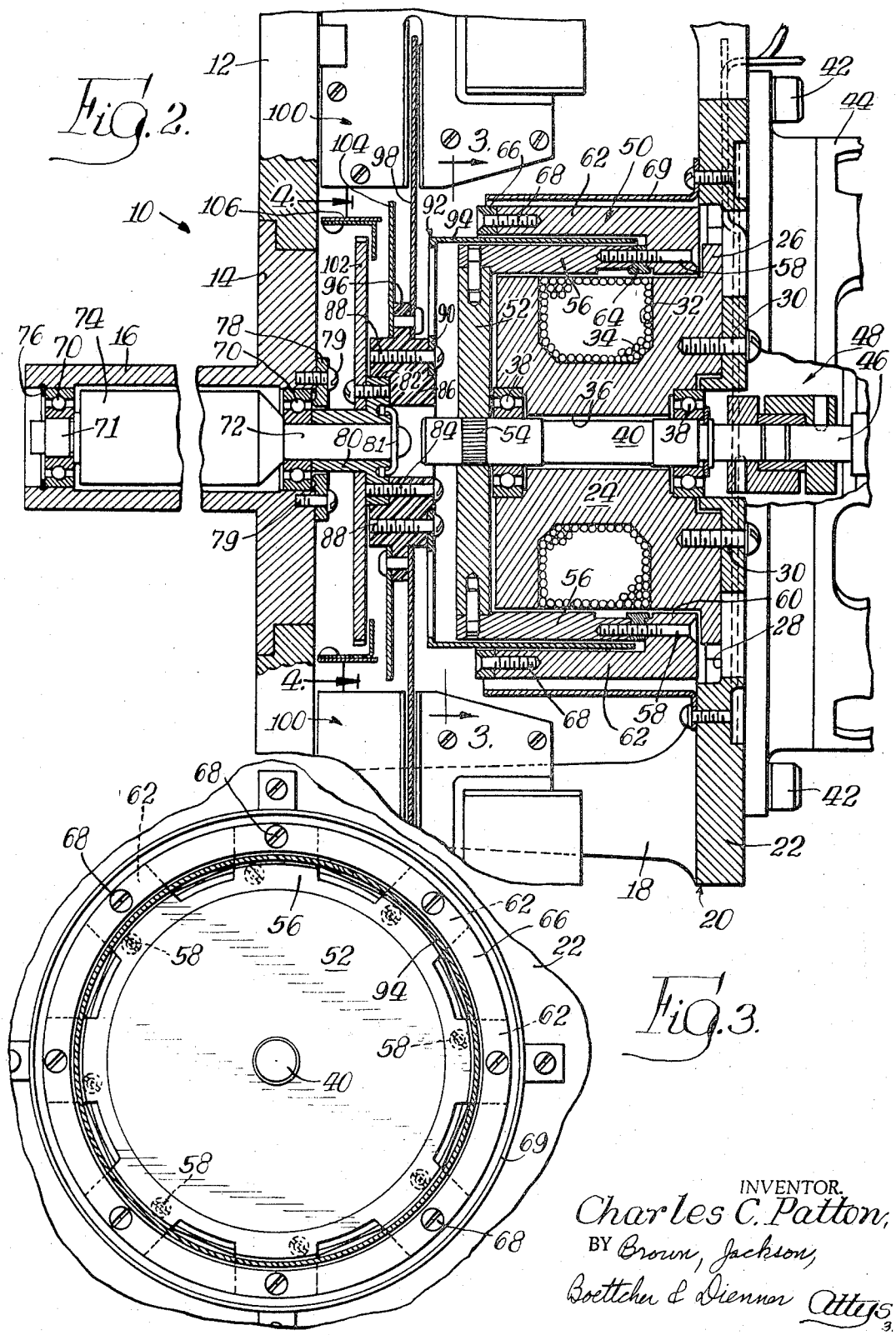

United States Patent Office 3,423,615
Patented Jan. 21, 1969

3,423,615
EDDY CURRENT COUPLING DEVICE
Charles C. Patton, Springfield, Ill., assignor to Sangamo Electric Company, Springfield, Ill., a corporation of Delaware
Filed Sept. 1, 1964, Ser. No. 393,607
U.S. Cl. 310—105
Int. Cl. H02k *49/04;* H02k *15/00*
15 Claims

ABSTRACT OF THE DISCLOSURE

An eddy current coupling device including a stationary member comprising a coil with a magnetic core and pole pieces, a driving member comprising a rotatable magnetic field structure with salient poles and an air gap, and a driven member comprising a thin-walled cup-shaped armature mounted for rotation within the air gap of the driving member. The bearings for the driving and driven members are independent of each other, damping means are provided for selectively imposing a braking load on the driven member when it is rotating, and a timing gear is mounted for rotation with the driven member for generating a reference frequency for speed control.

---

My present invention relates generally to a motor drive coupling unit, and more particularly to an eddy current coupling device especially adapted for use in the driving of a capstan of a magnetic tape transport.

In magnetic tape transports used in data recording and transcribing, rapid starts, quick changes in tape speed, close following of a master speed, accurate maintenance of a selected speed, and abrupt stops are of utmost importance. To meet these operational requirements, I have conceived of providing an eddy current coupling device for use in the driving of the capstan of the magnetic tape transport. Eddy current coupling devices which are also known as eddy current clutches offer advantages over friction clutches in that they operate with continuous slip or differential in speed between the driving and driven members. Because the slip varies in response to energization of the coupling field winding and the load, the speed of the driven member may be readily varied or controlled independently of the driving motor by varying the current in the field winding or the load on the driven member. Both of these methods of speed regulation are well adapted to servo control and are especially suited for use in connection with the driving of a capstan of a magnetic tape transport. Existing eddy current coupling devices, however, are unsatisfactory for use in a magnetic tape transport. First, known eddy current coupling devices have driven members made of magnetic materials such as cast iron. Therefore, the driven members have, not only high torque, but also high inertia. Because of the latter characteristic, rapid changes in speed and close speed control of the driven members are not possible. Secondly, in the prior art eddy current coupling devices, either the driving or the driven member supports one bearing of the other. The friction of such a bearing produces an undesirable variable driving torque on the driven member.

It is a primary object of my present invention to provide an eddy current coupling device especially adapted for use in the driving of a capstan of a magnetic tape transport.

It is another object of my present invention to provide an eddy current coupling device, as described, wherein the driven element is of low inertia so as to accommodate rapid changes in speed and close speed control thereof.

It is a further object of my present invention to provide an eddy current coupling device, as described, wherein the bearings for the driving member and the driven members are independent of each other so that frictional coupling between the driving and the driven members, and resultant variable driving torque on the driven member, are eliminated.

In accomplishing the foregoing objects, I provide an improved eddy current coupling device comprised of three members: one stationary, one driving and one driven. The stationary member consists of a coil or winding with a magnetic core and pole pieces. The driving member comprises a rotatable magnetic field structure, with salient poles and an air gap, mechanically coupled to a driving motor. The driving member serves as a coupling between the driving motor and the driven member. The driven member consists of a thin-walled cup-shaped armature mounted for rotation on an axis common to the driving member and within the air gap of the driving member. The driven member is made of a non-magnetic, low resistivity, light-weight metal, such as aluminum. The bearings for the driving and the driven members are independent of each other and are supported by stationary parts of the device.

In operation, the coil or winding of the stationary member is energized by direct current producing a magnetic field whose path lies through the rotatable driving member and across the air gap therein passing through the wall of the driven member. The rotation of the driving member with its salient poles rotates the field through and with respect to the driven member generating eddy currents therein which in turn produce magnetic fields tending to cause the driven member to rotate in the same direction as the driving member. In normal use, the driving motor, being of relatively high inertia, is driven at a pre-selected substantially constant speed, and the speed of the low inertia driven member is changed or controlled by the adjustment of the current in the winding of the stationary member and/or by varying the load on the driven member as through eddy current brake means cooperatively related with a damping disc mechanically coupled to the driven member.

Now in order to acquaint those skilled in the art with the manner of constructing and using eddy current coupling devices in accordance with the principles of my present invention, I shall describe in connection with the accompanying drawings, a preferred embodiment of my invention.

In the drawings:

FIGURE 2 is a partial median longitudinal sectional view, on an enlarged scale, of the eddy current coupling device of FIGURE 1;

FIGURE 3 is a partial transverse sectional view of my eddy current coupling device, taken substantially along the line 3—3 in FIGURE 2, looking in the direction indicated by the arrows.

Figure 1:
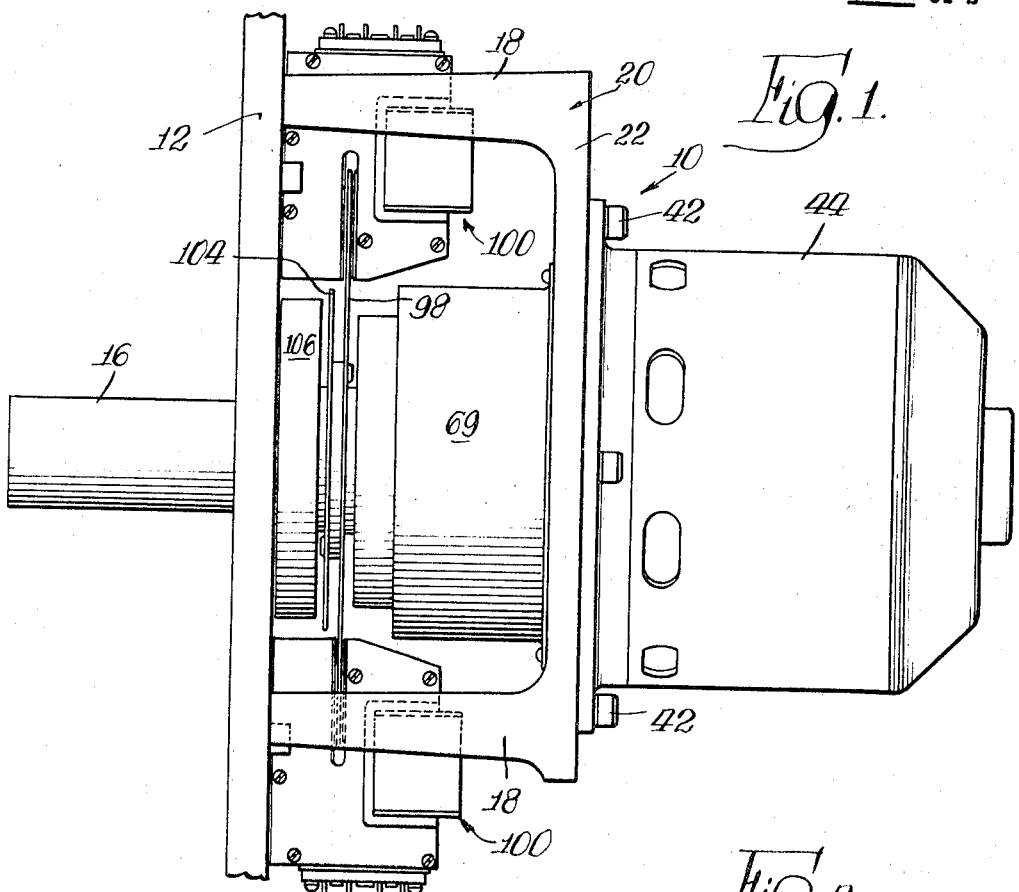
FIGURE 1 is a side elevational view of an eddy current coupling device incorporating the principles of my present invention.
Figure 4:
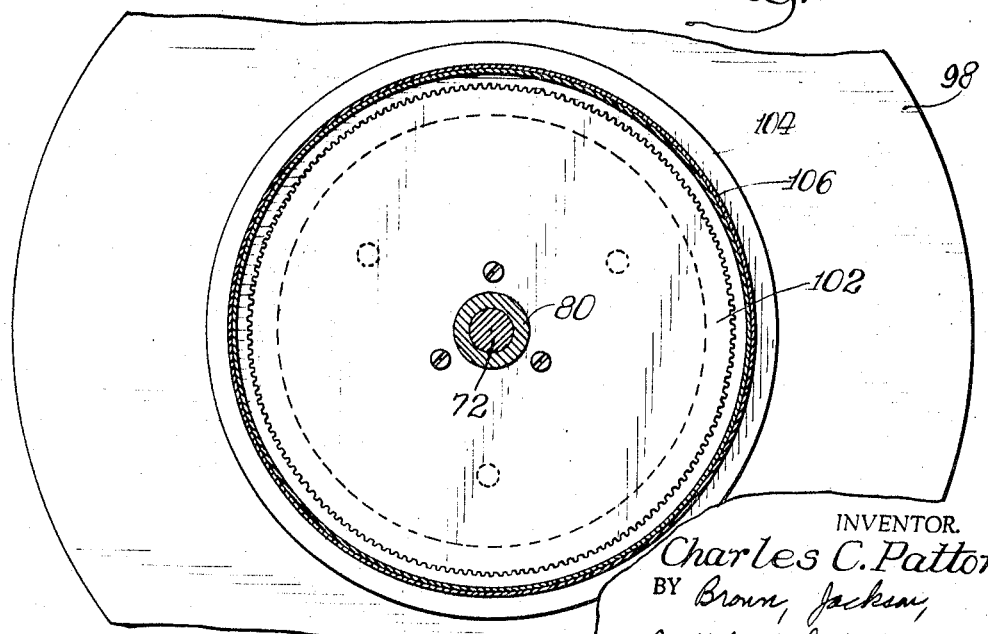
FIGURE 4 is a partial transverse sectional view of my eddy current coupling device, taken substantially along the line 4—4 in FIGURE 2, looking in the direction indicated by the arrows.

Referring now to the drawings, there is indicated generally by the reference numeral 10 an eddy current coupling device incorporating the principles of my present invention. The coupling device 10 is supported by framework comprised of a main mounting plate or wall portion 12 having disposed therein a removable section 14 from which projects perpendicularly a tubular portion 16. Suitably secured to the main mounting plate 12 are the leg portions 18 of a mounting bracket 20 having a wall portion 22 axially spaced from, and arranged parallel to, the main mounting plate 12.

The coupling device 10 comprises an annular stator member 24 of magnetic material having a radial flange portion 26 received in an annular recess 28 formed in the inboard side of the wall portion 22 of the mounting bracket 20. The stator member 24 is maintained in a stationary position by means of screws 30 threaded through the wall portion 22 into the adjacent face of the stator member 24. The stator member 24 has an annular channel 32 formed in the periphery thereof, whereby a magnetic core and pole pieces are defined, and disposed in the channel 32 is a coil or winding 34. The stator member 24 and coil 34 serve as a stationary field structure. The stator member 24 also has a central axial aperture 36 therethrough with ball bearing assemblies 38 suitably mounted in recesses adjacent the ends of the aperture 36. A drive or input shaft 40 extends through the aperture 36 and is journalled in the ball bearing assemblies 38. Secured to the outboard side of the wall portion 22 of the mounting bracket 20, as by means of bolts 42, is an electric motor 44 having an output shaft 46 connected by a flexible coupling 48 to the adjacent end of the drive shaft 40.

The coupling device 10 further comprises a driving member or rotor assembly indicated generally by the reference numeral 50. The rotor assembly 50 includes a radial flange member 52 forcibly fitted on the knurled portion 54 of the drive shaft 40. The flange member 52 carries an annular cage portion with radially spaced pole segments concentric of the stator member 24. More specifically, a first set of circumferentially spaced pole members 56 extend axially from the periphery of the radial flange member 52 in the direction of the wall portion 22 of the mounting bracket 20 concentrically of the stator member 24. Secured to the free ends of the first set of pole members 56, as by screws 58 of non-magnetic material, is an annular ring 60 having a second set of circumferentially spaced pole members 62 extending axially therefrom in the direction of the main mounting plate 12 concentrically and radially outwardly of the first set of pole members 56. An annular space 64 is interposed between the annular ring 60 and the free ends of the first set of pole members 56, and a ring member 66 is secured, as by screws 68, to the free ends of the second set of pole members 62. The flange member 52, the ring 60 and the pole members 56 and 62 are fabricated of magnetic material, while the spacer 64 and the ring member 66 are fabricated of nonmagnetic material. The rotor assembly 50 serves to define a rotatable magnetic field structure with salient pole portions and arcuate air gaps concentric of the stationary field structure. The stationary field structure and the rotating salient poles of the driving member 50 are so designed that there is no change in the magnetic reluctance of the path between them during rotation. Also, the magnetic attraction across the air gaps is so balanced that there is little side or end thrust imposing a load on the ball bearing assemblies 38. The rotor assembly 50 has disposed thereabout an annular casing 69 secured to the inboard side of the wall portion 22 of the mounting bracket 20.

Rotatably mounted within the tubular portion 16 of the removable section 14 of the main mounting plate 12, as by means of axially spaced ball bearing assemblies 70, are the reduced end portions 71 and 72 of a capstan 74 of a magnetic tape transport. The reduced end portion 72 projects inwardly of the main mounting plate 12 and terminates at the adjacent end of the drive shaft 40. The axis or rotation of the capstan 74 coincides with the axis of rotation of the drive shaft 40. The ball bearing assemblies 70 and the capstan 74 are maintained in assembled relation by means of a snap ring 76 secured in the outer end of the tubular portion 16 and a retaining ring 78 secured, as by screws 79, to the inboard side of the removable section 14 of the main mounting plate 12. Mounted on the reduced end portion 72 of the capstan 74 for rotation therewith is an annular hub member 80 held in position by a retaining member 81 and having a radial flange portion 82 to which is secured, as by screws 84, an annular insulating hub portion 86. The hub member 80 and insulating hub portion 86 together serve as a hub assembly. Secured within an annular recess formed in the side of the insulating hub portion 86 facing the rotor assembly 50, as by screws 88, is the apertured radial flange portion 90 of a thin-walled cup-shaped armature or driven member 92. The annular rim portion 94 of the armature or output member 92 extends axially from the periphery of the apertured radial flange portion 90 concentrically within the air gaps intermediate of the first and second sets of pole members 56 and 62 of the rotor assembly 50. The armature 92 is fabricated of a non-magnetic, low resistivity, lightweight metal, such as aluminum.

The insulating hub portion 86 is also provided with a radial flange portion 96 which at one side provides support for a radially disposed non-magnetic damping disc 98. Secured to the inboard side of the main mounting plate 12 are a pair of diametrically opposed eddy current brake devices 100 having pole pieces disposed adjacent opposite faces of the damping disc 98. Secured to the radial flange 82 of the hub member 80 axially intermediate of the damping disc 98 and the main mounting plate 12 is a timing gear 102 having very fine teeth on the periphery thereof. The timing gear 102 is magnetically shielded by means of a radially disposed disc 104 secured to the radial flange portion 96 of the insulating hub portion 86 intermediate of the damping disc 98 and the timing gear 102 and by means of an annular shroud 106 secured to the inboard side of the main mounting plate 12 concentrically of the timing gear 102.

In the operation of the eddy current coupling device 10, the coil 34 is energized by direct current producing a magnetic field whose path extends through the rotor assembly 50, the air gaps intermediate of the pole members 56 and 62, and the annular rim portion 94 of the armature 92. Rotation of the rotor assembly 50, upon energization of the electric motor 44, rotates the magnetic field produced in the rotor assembly 50 through and with respect to the armature rim 94 generating eddy currents therein which in turn produce magnetic fields tending to cause the armature 92 to rotate in the same direction. The torque transmitted by the coupling device depends upon the difference in speed or slip between the rotating field of the rotor assembly 50 and the armature 92. The torque is at a maximum when there is a maximum difference in speed between the rotor assembly 50 and the armature 92, and the torque approaches zero as the rotational speed of the armature 92 approaches the rotational speed of the rotor assembly 50.

Normally, the motor 44, which is of relatively high inertia, will be driven at a pre-selected substantially constant speed. In such circumstances, the speed of the armature 92 may be regulated by adjusting the amount of current introduced into the coil 34. Additionally, or alternatively, the speed of the armature 92 may be regulated by varying the load on the armature 92. This may be done by selectively energizing the eddy current brake devices 100 whereby a braking load is imposed on the damping disc 98 as it is rotating with the armature 92.

Also rotatable with the armature 92 is the timing gear 102. In the recording mode of the magnetic tape transport in which the eddy current coupling device is incorporated, the timing gear 102 generates an alternating voltage of a frequency proportional to the speed of the capstan 74. The voltage generated by the timing gear is continuously compared as to frequency and phase with the output voltage of an internal crystal-controlled oscillator (not shown) and by suitable circuitry (not shown) any difference in frequency or phase between these two voltages is quickly eliminated by an error signal amplified and applied to the eddy current brake devices 100.

In the playback mode either the standard reference frequency signal recorded on the tape, or the voltage generated by the timing gear 102, is continuously compared as to frequency and phase with the output voltage of the internal crystal-controlled oscillator and any difference in frequency or phase is quickly eliminated by the error signal amplified and applied to the eddy current brake device as in the recording mode.

From the foregoing description, it will be readily appreciated that, due to the low inertia of the armature 92, rapid changes in speed and accurate speed control of the armature 92 and capstan 74 may be accomplished with the eddy current coupling device of my present invention. In addition, my coupling device does not require the use of slip rings as in the case of moving coil coupling devices. Therefore, all difficulties arising from the maintenance and operation of slip rings are avoided. Also, because the bearings supporting the rotor assembly 50 and the armature 92 are independent of one another, frictional coupling between the rotor assembly 50 and the armature 92, and resultant variable driving torque on the armature 92, are eliminated. Furthermore, by eliminating frictional coupling, the torque on the driven element can be reduced to zero by de-energizing the field coil, aberrations in speed of the driven member due to variations in friction are eliminated, and more accurate speed control is permitted. Still further, by virtue of the dual control means for regulating speed and the provision of a timing gear for generating a reference frequency, the eddy current coupling device of my present invention facilitates rapid starts, quick changes in tape speeds, close following of a master speed, accurate maintenance of a selected speed, and abrupt stops.

While I have shown and described what I believe to be a preferred embodiment of my present invention, it will be understood by those skilled in the art that various rearrangements and modifications may be made therein without departing from the spirit and scope of my invention.

I claim:
1. An eddy current coupling device comprising a driving member, a driven member, means including stationary coil means for establishing a magnetic field when said driving member is rotated whereby said driven member is rotated therewith, the speed of the driven member being adjustable by variation of the value of current applied to said coil means, and damping means including field producing means for selectively imposing a braking load of different values on said driven member, said damping means being adjustable to provide different braking loads with application of signals of correspondingly different values to said field producing means.

2. An eddy current coupling device comprising a driving member, a driven member, means for establishing a magnetic field when said driving member is rotated whereby said driven member is rotated therewith, damping means having field producing means for selectively imposing different value braking loads to said driven member with application of error signals of different values to said field producing means, and timing means mounted for rotation with said driven member for generating a reference frequency signal for use in providing error signals of different values to said field producing means.

3. An eddy current coupling device comprising annular stationary coil means, a rotor assembly having salient pole portions with air gaps concentric of said coil means, input means for rotating said rotor assembly, an output member having a portion thereof received in said air gaps and said output member being rotated when said coil means is energized and said rotor assembly is rotated.

4. An eddy current coupling device comprising annular stationary coil means, an input shaft extending through said coil means, a rotor assembly secured to said drive shaft and having salient pole portions with arcuate air gaps concentric of said coil means, an output member having an annular thin-walled portion received in said air gaps, and said output member being rotated when said coil means is energized and said rotor assembly is rotated.

5. An eddy current coupling device comprising an annular stationary stator member having an annular channel formed in the periphery thereof, a coil disposed in said channel, said stator member having a central axial aperture therethrough, a drive shaft extending through said aperture and being journalled therein, a rotor assembly having a radial flange portion secured to said drive shaft at one side of said stator member and having an annular cage portion with radially spaced pole segments concentric of said stator member, an armature having a thin-walled annular rim portion disposed concentrically intermediate of said radially spaced rotor assembly cage segments, means for rotatably mounting said armature coaxially and independently of said drive shaft, and said armature being rotated when said coil is energized and said rotor assembly is rotated.

6. An eddy current coupling device comprising an annular stationary stator member having an annular channel formed in the periphery thereof, a coil disposed in said channel, said stator member having a central axial aperture therethrough, a drive shaft extending through said aperture and being journalled therein, a rotor assembly having a radial flange portion secured to said drive shaft at one side of said stator member and having an annular cage portion with radially spaced pole segments concentric of said stator member, a cup-shaped armature having an annular rim portion disposed concentrically intermediate of said radially spaced rotor assembly cage segments, means for rotatably mounting said armature coaxially and independently of said drive shaft, said armature being rotated when said coil is energized and said rotor assembly is rotated, a radially disposed damping disc mounted for rotation with said armature, and stationary eddy-current brake means adjacent said damping disc for selectively imposing a braking load on said damping disc when it is rotating.

7. An eddy current coupling device comprising an annular stationary stator member having an annular channel formed in the periphery thereof, a coil disposed in said channel, said stator member having a central axially aperture therethrough, a drive shaft extending through said aperture and being journalled therein, a rotor assembly having a radial flange portion secured to said drive shaft at one side of said stator member and having a first set of circumferentially spaced hole portions extending axially from the periphery of said radial flange portion in the direction of the other side of said stator member concentrically of the latter, said rotor assembly having an annular ring portion secured to the free ends of said first set of pole portions and having a second set of circumferentially spaced pole portions extending axially from said ring portion in the direction of said one side of said stator member cencentrically and radially outwardly of said first set of pole portions, an annular non-magnetic spacer member between said ring portion and said free ends of said first set of pole portions, a ring member secured to the free ends of said second set of pole portions, a cup-shaped armature having an annular rim portion disposed concentrically intermediate of said first and second sets of pole portions, means for rotatably mounting said armature coaxially and independently of said drive shaft, and said armature being rotated when said coil is energized and said rotor assembly is rotated.

8. An eddy current coupling device comprising an annular stationary stator member having an annular channel formed in the periphery thereof, a coil disposed in said channel, said stator member having a central axial aperture therethrough, a drive shaft extending through said aperture and being journalled therein, a rotor assembly having a radial flange portion secured to said drive shaft at one side of said stator member and having a first set of circumferentially spaced pole portions extending axially from the periphery of said radial flange portion in the direction of the other side of said stator member concentrically of the latter, said rotor assembly having an annular ring portion secured to the free ends of said first set of pole portions and having a second set of circumferentially spaced pole portions extending axially from said ring portion in the direction of said one side of said stator member concentrically and radially outwardly of said first set of pole portions, a cup-shaped armature having an annular rim portion disposed concentrically of said first and second sets of pole portions, means for rotatably mounting said armature coaxially and independently of said drive shaft, said armature being rotated when said coil is energized and said rotor assembly is rotated, a radially disposed damping disc mounted for rotation with said armature, and stationary eddy current brake means adjacent said damping disc for selectively imposing a braking load on said dampng disc when it is rotating.

9. An eddy current coupling device comprising an annular stationary stator member having an annular channel formed in the periphery thereof, a coil disposed in said channel, said stator member having a central axial aperture therethrough, a drive shaft extending through said aperture and being journalled therein, a rotor assembly having a redial flanged portion secured to said drive shaft at one side of said stator member and having a first set of circumferentially spaced pole portions extending axially from the periphery of said radial flange portion in the direction of the other side of said stator member concentrically of the latter, said rotor assembly having an annular ring portion secured to the free ends of said first set pole portions and having a second set of circumferentially spaced pole portions extending axially from said ring portions in the direction of said one side of said stator member concentrically and radially outwardly of said first set of pole portions, a cup-shaped armature having an annular rim portion disposed concentrically intermediate of said first and second sets of pole portions, means for rotatably mounting said armature coaxially and independently of said drive shaft, said armature being rotated when said coil is energized and said rotor assembly is rotated, a radially disposed damping disc mounted for rotation with said armature, stationary eddy current brake means adjacent said damping disc for selectively imposing a braking load on said damping disc when it is rotating, a timing gear mounted for rotation with said armature for generating upon rotation a reference frequency for speed control, and magnetic-shield means arranged intermediate of said timing gear and said damping disc.

10. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposed in said channel, said stator member having a central axial aperture therethrough, a drive shaft extending through said aperture and being journalled therein, a motor secured to the outboard side of said one wall portion and having driving connection with one end of said drive shaft, a rotor assembly having a radial flange portion secured to the other end of said drive shaft axially intermediate of said wall portions and having an annular cage portion with radially spaced pole segments concentric of said stator member, a capstan rotatably mounted in said other wall portion on an axis coinciding with the axis of said drive shaft, a hub assembly secured to said capstan adjacent the inboard side of said other wall portion, a cup-shaped armature having a radial flange portion secured to said hub assembly and having an annular rim portion extending axially from the periphery of said latter flange portion concentrically intermediate of said radially spaced rotor assembly cage segments, said armature being rotated when said coil is energized and said rotor assembly is rotated, a radially disposed damping disc secured to said hub assembly, and eddy current brake means secured to the inboard side of said other wall portion adjacent said damping disc for selectively imposing a braking load on said damping disc when it is rotating.

11. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposed in said channel said stator member having a central axial aperture therethrough, a drive shaft extending through said aperture and being journalled therein, a motor secured to the outboard side of said one wall portion and having driving connection with one end of said drive shaft, a rotor assembly having a radial flange portion secured to the other end of said drive shaft axially intermediate of said wall portions and having an annular cage portion with radially spaced pole segments concentric of said stator member, a capstan rotatably mounted in said other wall portion on an axis coinciding with the axis of said drive shaft, a hub assembly secured to said capstan adjacent the inboard side of said other wall portion, a cup-shaped armature having a radially flange portion secured to said hub assembly and having an annular rim portion extending axially from the periphery of said latter flange portion concentrically intermediate of said radially spaced rotor assembly cage segments, said armature being rotated when said coil is energized and said rotor assembly is rotated, a radially disposed damping disc secured to said hub assembly, eddy current brake means secured to the inboard side of said other wall portion adjacent said damping disc for selectively imposing a braking load on said damping disc when it is rotating, a timing gear secured to said hub assembly axially intermediate of said damping disc and said other wall portion for generating upon rotation a reference frequency for speed control, a radially disposed magnetic-shield disc secured to said hub assembly axially intermediate of said damping disc and said timing gear, and a magnetic-shield shroud secured to said other wall portion concentrically of said timing gear.

12. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposed in said channel, said stator member having a central axial aperture therethrough, a drive shaft extending through said aperture and being journalled therein, a motor secured to the outboard side of said one wall portion and having driving connection with one end of said drive shaft, a rotor assembly having a radial flange portion secured to the other end of said drive shaft axially intermediate of said wall portions and having a first set of circumferentially spaced pole portions extending axially from the periphery of said radial flange portion in the direction of said one wall portion concentrically of said stator member, said rotor assembly having an annular ring portion secured to the free ends of said first set of pole portions and having a second set of circumferentially spaced pole portions extending axially from said ring portion in the direction of the other of said wall portions concentrically and radially outwardly of said first set of pole portions, a capstan rotatably mounted in said other wall portion on an axis coinciding with the axis of said drive shaft, a hub assembly secured to said capstan adjacent the inboard side of said other wall portion, a cup-shaped armature having a radial flange portion secured to said hub assembly and having an annular rim portion extending axially from the periphery of said latter radial flange portion concentrically intermediate of said first and second sets of pole portions, said armature being rotated when said coil is energized and said rotor assembly is rotated, a radially disposed damping disc secured to said hub assembly, a pair of diametrically opposed eddy current brake devices secured to the inboard side of said other wall portion adjacent said damping disc for selectively imposing a braking load on said damping disc when it is rotating, and a timing gear secured to said hub assembly axially intermediate of said damping disc and said other wall portion for generating upon rotation a reference frequency for speed control.

13. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposed in said channel, said stator member having a central axial aperture therethrough, a drive shaft extending through said aperture and being journalled therein, a motor secured to the outboard side of said one wall portion and having driving connection with one end of said drive shaft, a rotor assembly having a radial flange portion secured to the other end of said drive shaft axially intermediate of said wall portions and having a first set of circumferentially spaced pole portions extending axially from the periphery of said radial flange portion in the direction of said one wall portion concentrically of said stator member, said rotor assembly having an annular ring portion secured to the free ends of said first set of pole portions and having a second set of circumferentially spaced pole portions extending axially from said ring portion in the direction of the other of said wall portions concentrically and radially outwardly of said first set of pole portions, an annular non-magnetic spacer member between said ring portion and said free ends of said first set of pole portions, a ring member secured to the free end of said second set of pole portions, a capstan rotatably mounted in said other wall portion on an axis coinciding with the axis of said drive shaft, a hub assembly secured to said capstan adjacent the inboard side of said other wall portion, a cup-shaped armature having a radial flange portion secured to said hub assembly and having an annular rim portion extending axially from the periphery of said latter radial flange portion concentrically intermediate of said first and second sets of pole portions, and said armature being rotated when said coil is energized and said rotor assembly is rotated.

14. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposed in said channel, said stator member having a central axial aperture therethrough, bearing assemblies mounted in said stator member adjacent the ends of said aperture, a drive shaft extending through said aperture and being journalled in said bearing assemblies, a motor secured to the outboard side of said one wall portion and having an output shaft coupled to one end of said drive shaft, a rotor assembly having a radial flange portion secured to the other end of said drive shaft axially intermediate of said wall portions and having a first set of circumferentially spaced pole portions extending axially from the periphery of said radial flange portion in the direction of said one wall portion concentrically of said stator member, said rotor assembly having an annular ring portion secured to the free ends of said first set of pole portions and having a second set of circumferentially spaced pole portions extending axially from said ring portion in the direction of the other of said wall portions concentrically and radially outwardly of said first set of pole portions, an annular non-magnetic spacer member between said ring portion and said free ends of said first set of pole portions, a ring member secured to the free ends of said second set of pole portions, a capstan rotatably mounted in said other wall portion on an axis coinciding with the axis of said drive shaft, a hub assembly secured to said capstan adjacent the inboard side of said other wall portion, a cup-shaped armature having an apertured radial flange portion secured to said hub assembly and having an annular rim portion extending axially from the periphery of said apertured radial flange portion concentrically intermediate of said first and second sets of pole portions, said armature being rotated when said coil is energized and said rotor assembly is rotated, a radially disposed damping disc secured to said hub assembly, and eddy current brake means secured to the inboard side of said other wall portion adjacent said damping disc for selectively imposing a braking load on said damping disc when it is rotating.

15. An eddy current coupling device comprising framework having a pair of axially spaced wall portions with inboard sides facing each other and with outboard sides facing away from each other, an annular stator member secured to the inboard side of one of said wall portions, said stator member having an annular channel formed in the periphery thereof, a coil disposd in said channel, said stator member having a central axial aperture therethrough, bearing assemblies mounted in said stator member adjacent the ends of said aperture, a drive shaft extending through said aperture and being journalled in said bearing assemblies, a motor secured to the outboard side of said one wall portion and having an output shaft connected by means of a flexible coupling to one end of said drive shaft, a rotor assembly having a radial flange portion secured to the other end of said drive shaft axially intermediate of said wall portions and having a first set of circumferentially spaced pole portions extending axially from the periphery of said radial flange portion in the direction of said one wall portion concentrically of said stator member, said rotor assembly having an annular ring portion secured to the free ends of said first set of pole portions and having a second set of circumferentially spaced pole portions extending axially from said ring portion in the direction of the other of said wall portions concentrically and radially outwardly of said first set of pole portions, an annular non-magnetic spacer member between said ring portion and said free ends of said first set of pole portions, a ring member secured to the free ends of said second set of pole portions, a capstan rotatably mounted in said other wall portion on an axis coinciding with the axis of said drive shaft, a hub assembly secured to said capstan adjacent the inboard side of said other wall portion, a cup-shaped armature having an apertured radial flange portion secured to said hub assembly and having an annular rim portion extending axially from the periphery of said apertured radial flange portion concentrically intermediate of said first and second sets of pole portions, said armature being rotated when said coil is energized and said rotor assembly is rotated, a radially disposed damping disc secured to said hub assembly, a pair of diametrically opposed eddy current brake devics secured to the inboard side of said other wall portion adjacent said damping disc for selectively imposing a braking load on said damping disc when it is rotating, a timing gear secured to said hub assembly axially intermediate of said damping disc and said other wall portion for generating upon rotation a reference frequency for speed control, a radially disposed magnetic-shield disc secured to said hub assembly axially intermediate of said damping disc and said timing gear, and a magnetic-shield shroud secured to said other wall portion concentrically of said timing gear.

References Cited

UNITED STATES PATENTS

| | | | |
|---|---|---|---|
| 3,020,427 | 2/1962 | Wheeler et al. | 310—105 |
| 3,198,975 | 8/1965 | Fisher | 310—105 |
| 3,215,874 | 11/1965 | Woodward | 310—105 |
| 3,235,759 | 2/1966 | Bowie | 310—103 |

ROBERT K. SCHAEFER, *Primary Examiner.*

H. O. JONES, *Assistant Examiner.*

U.S. Cl X.R.

310—103